United States Patent
Ishihara et al.

(10) Patent No.: US 10,171,752 B2
(45) Date of Patent: Jan. 1, 2019

(54) IMAGING APPARATUS, DISPLAY METHOD, AND PROGRAM

(71) Applicant: Olympus Corporation, Hachioji-shi, Tokyo (JP)

(72) Inventors: Haruyuki Ishihara, Hino (JP); Masashi Takahashi, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/666,584

(22) Filed: Aug. 2, 2017

(65) Prior Publication Data

US 2017/0332019 A1 Nov. 16, 2017

Related U.S. Application Data

(63) Continuation of application No. PCT/JP2015/059052, filed on Mar. 25, 2015.

(30) Foreign Application Priority Data

Feb. 2, 2015 (JP) .................................. 2015-018404
Feb. 10, 2015 (JP) .................................. 2015-024325

(51) Int. Cl.
*H04N 5/262* (2006.01)
*G11B 27/00* (2006.01)
(Continued)

(52) U.S. Cl.
CPC ......... *H04N 5/2628* (2013.01); *G11B 27/007* (2013.01); *G11B 27/30* (2013.01);
(Continued)

(58) Field of Classification Search
CPC ............... H04N 5/2628; H04N 5/2345; H04N 5/23293; H04N 5/77; G11B 27/007; G11B 27/30
See application file for complete search history.

(56) References Cited

U.S. PATENT DOCUMENTS 7,068,307 B2 6/2006 Hyodo
2002/0054115 A1* 5/2002 Mack ...................... G06T 11/60
715/765
(Continued)

FOREIGN PATENT DOCUMENTS

EP 2007136 12/2008
JP 2002-218384 8/2002
(Continued)

OTHER PUBLICATIONS

International Search Report ("ISR") to corresponding International Application No. PCT/JP2015/059052, dated Jun. 16, 2015 (4 pgs.), with translation (2 pgs.).

*Primary Examiner* — Hung Q Dang
*Assistant Examiner* — Sunghyoun Park
(74) *Attorney, Agent, or Firm* — John C. Pokotylo; Pokotylo Patent Services

(57) ABSTRACT

An imaging apparatus includes: an imaging unit configured to continuously image a subject and generate moving image data of the subject; a display unit configured to display a moving image corresponding to the moving image data; a shooting controller configured to control the imaging unit to continuously image the subject in a moving image mode capable of connecting different pieces of the moving image data having different shooting time-points; a thumbnail generation unit configured to generate resized image data by performing resize processing of reducing a size of image data of at least one frame constituting the moving image data, and generate a thumbnail by combining a resized image corresponding to the resized image data with a template having a display area displaying information indicating that a different piece of the moving image data may be connected; and a display controller configured to display the thumbnail.

12 Claims, 10 Drawing Sheets

(51) Int. Cl.
*G11B 27/30* (2006.01)
*H04N 5/232* (2006.01)
*H04N 5/77* (2006.01)
*H04N 9/82* (2006.01)

(52) U.S. Cl.
CPC ..... *H04N 5/23245* (2013.01); *H04N 5/23293* (2013.01); *H04N 5/77* (2013.01); *H04N 5/772* (2013.01); *H04N 9/8227* (2013.01)

(56) References Cited

U.S. PATENT DOCUMENTS

| | | | | |
|---|---|---|---|---|
| 2007/0124737 | A1* | 5/2007 | Wensley | G06F 9/546 719/314 |
| 2014/0351763 | A1* | 11/2014 | Lee | G03B 37/00 715/838 |
| 2015/0009278 | A1* | 1/2015 | Modai | H04N 7/15 348/14.08 |

FOREIGN PATENT DOCUMENTS

| | | |
|---|---|---|
| JP | 2005-006059 | 1/2005 |
| JP | 2009-004993 | 1/2009 |
| JP | 2010-147659 | 7/2010 |
| JP | 2012-165050 | 8/2012 |

* cited by examiner

IMAGING APPARATUS, DISPLAY METHOD, AND PROGRAM

CROSS REFERENCES TO RELATED APPLICATIONS

This application is a continuation of PCT international application Ser. No. PCT/JP2015/059052 filed on Mar. 25, 2015 which designates the United States, incorporated herein by reference, and which claims the benefit of priority from Japanese Patent Applications No. 2015-018404, filed on Feb. 2, 2015 and Japanese Patent Applications No. 2015-024325, filed on Feb. 10, 2015, incorporated herein by reference.

BACKGROUND

The present disclosure relates to an imaging apparatus, a display method, and a program.

In recent years, there is a known technique, on an imaging apparatus such as a digital camera, of editing a plurality of pieces of mutually associated moving image data edited as a piece of moving image data (refer to JP 2005-6059 A). This technique mutually connects a plurality of pieces of moving image data captured with a shooting time-point interval of a predetermined time-span or below and edits them into a piece of moving image data.

Meanwhile, when captured still image data or moving image data are played back and displayed on the known imaging apparatus, thumbnails representing the individual still image data and the moving image data are displayed as a list on a display unit, and the still image data or the moving image data that correspond to the thumbnail selected by a user are played back and displayed. Unfortunately, however, JP 2005-6059 A uses a same display form for all moving image thumbnails, and thus, it is difficult for the user to judge whether the moving image data are connectable based on the thumbnail displayed by the display unit.

SUMMARY

An imaging apparatus according to one aspect of the present disclosure includes: an imaging unit configured to continuously image a subject and generate moving image data of the subject; a display unit configured to display a moving image corresponding to the moving image data; a shooting controller configured to control the imaging unit to continuously image the subject in a moving image mode capable of connecting different pieces of the moving image data having different shooting time-points; a thumbnail generation unit configured to generate resized image data by performing resize processing of reducing a size of image data of at least one frame constituting the moving image data based on the moving image data generated by the imaging unit, and generate a thumbnail representing the moving image data by combining a resized image corresponding to the resized image data with a template having a display area displaying information indicating that a different piece of the moving image data may be connected; and a display controller configured to display the thumbnail generated by the thumbnail generation unit on the display unit.

The above and other features, advantages and technical and industrial significance of this disclosure will be better understood by reading the following detailed description of presently preferred embodiments of the disclosure, when considered in connection with the accompanying drawings.

DETAILED DESCRIPTION

Figure 1:
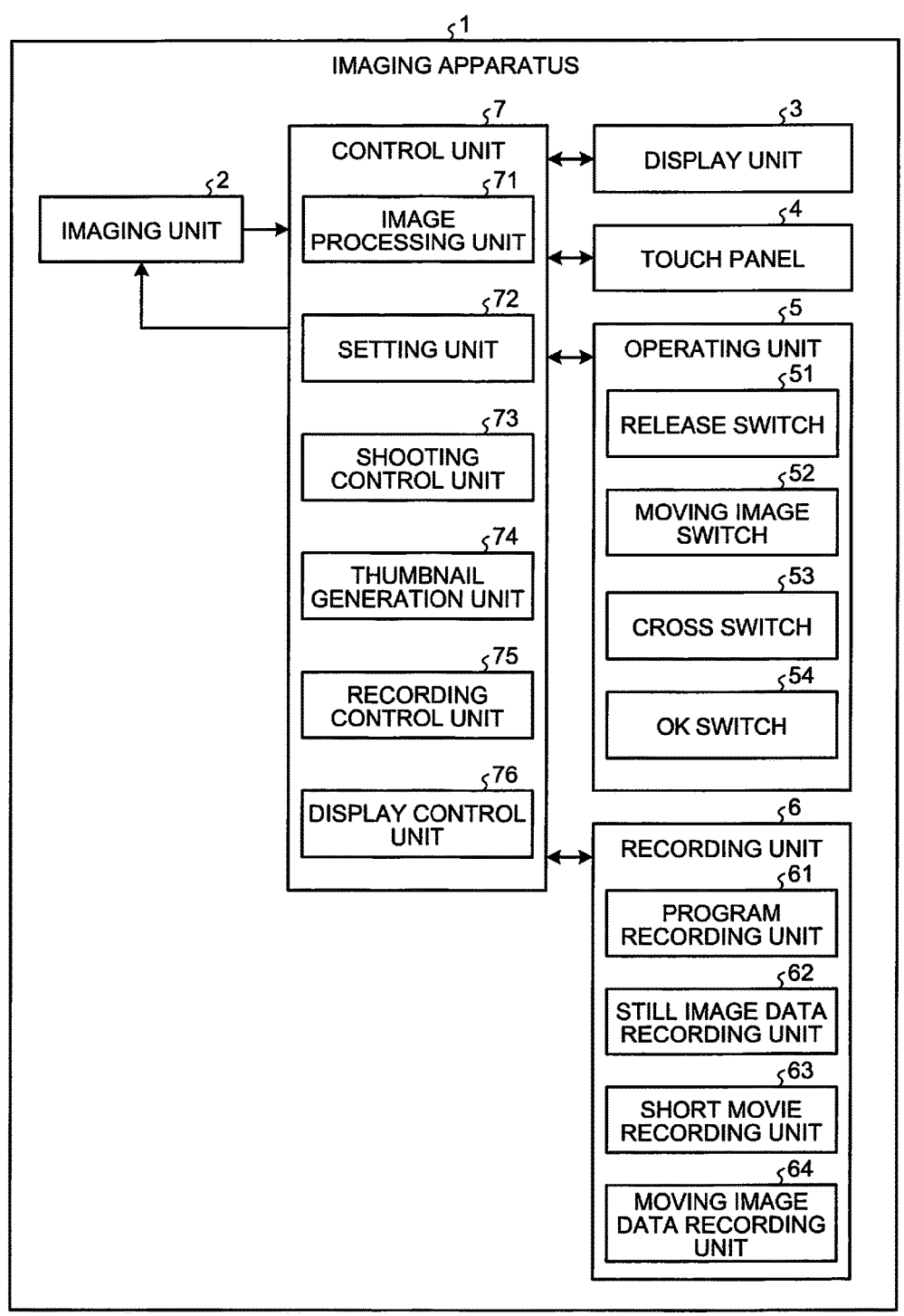
FIG. 1 is a block diagram illustrating a functional configuration of an imaging apparatus according to an embodiment of the present disclosure.

Hereinafter, embodiments of the present disclosure (hereinafter, referred to as embodiment(s)) will be described with reference to the drawings. Note that the present disclosure is not limited by the following embodiments. In the drawings, same reference signs are attached to the same portions. While a mode of "short movie" specified to capture and join short-time moving images will be mainly described, the present disclosure is not substantially limited to the short movies.

Configuration of Imaging Apparatus

FIG. 1 is a block diagram illustrating a functional configuration of an imaging apparatus according to an embodiment of the present disclosure. An imaging apparatus 1 illustrated in FIG. 1 includes an imaging unit 2, a display unit 3, a touch panel 4, an operating unit 5, a recording unit 6, and a control unit 7.

Under the control by the control unit 7, the imaging unit 2 images a subject and continuously generates image data of the subject. Moreover, the imaging unit 2 continuously images the subject and generates moving image data of the subject. The imaging unit 2 includes an optical system, an imaging element, a diaphragm, and a shutter. The optical system forms a subject image. Exemplary imaging elements include a charge coupled device (CCD) and a complementary metal oxide semiconductor (CMOS). The imaging element generates image data of the subject by receiving the subject image formed by the optical system and performing photoelectric conversion on the subject image. The diaphragm adjusts exposure by limiting the amount of incident light collected by the optical system. The shutter sets a state of the imaging element to an exposure state or a light-shielding state.

The display unit 3 displays an image that corresponds to the image data generated by the imaging unit 2, a moving image that corresponds to the moving image data generated by the imaging unit 2, or various types of information regarding the imaging apparatus 1. Moreover, the display unit 3 plays back and displays an image that corresponds to the image data recorded by the recording unit 6. The display unit 3 includes a display panel formed with liquid crystal, organic electro luminescence (EL), or the like.

The touch panel 4 is provided on the display area of the display unit 3 in an overlapping state, receives an input of a signal that corresponds to the contact position of an external object, and outputs the signal to the control unit 7.

The operating unit 5 receives an input of a signal regarding various types of operation of the imaging apparatus 1. The operating unit 5 includes a release switch 51, a moving image switch 52, a cross switch 53, and an OK switch 54. The release switch 51 receives at least an input of a release signal that instructs still image shooting. The moving image switch 52 receives an input of a start signal that instructs the start of moving image shooting to the imaging unit 2, and a finish signal that instructs the finish of the moving image shooting to the imaging unit 2. The cross switch 53 receives an input of various operation signals of the imaging apparatus 1. The OK switch 54 receives an input of an instruction signal that determines setting, or the like, selected by the cross switch 53. Each of the cross switch 53 and the OK switch 54 receives an input of an instruction signal that sets a first moving image mode or a second moving image mode. The first moving image mode generates moving image data by causing the imaging unit 2 to continuously image the subject from the point of reception of the input of the start signal by the moving image switch 52 till the point of reception of the input of the finish signal. The second moving image mode generates moving image data by causing the imaging unit 2 to continuously image the subject for a prescribed time-span (for example, four seconds) from the point of input of the start signal on the moving image switch 52. The second moving image mode may mutually connect a plurality of pieces of moving image data generated by the imaging unit 2 in the second moving image mode at different shooting time-points. Furthermore, each of the cross switch 53 and the OK switch 54 receives an input of an instruction signal that instructs a playback order of a previous moving image and a latest moving image displayed by the display unit 3.

The recording unit 6 records image data generated by the imaging unit 2 or various types of information regarding the imaging apparatus 1. The recording unit 6 includes a program recording unit 61, a still image data recording unit 62, a short movie recording unit 63, and a moving image data recording unit 64. The program recording unit 61 records a program executed by the imaging apparatus 1. The still image data recording unit 62 records still image data. The short movie recording unit 63 records moving image data obtained by shooting for a predetermined time-span, that is, connection moving image data (hereinafter, referred to as a "short movie") that may be connected with the moving image data captured at a different shooting time-point and having the same special effect processing, the frame rate, and the moving image format. The moving image data recording unit 64 records moving image data. Herein, exemplary frame rates include 15 fps, 20 fps, 30 fps, 50 fps, and 60 fps. Moreover, exemplary moving image formats include H.264, an AVCHD system, an MPEG4 system, an AVI method, and a MOV method. Furthermore, the special effect processing is processing of generating visual effects by combining a plurality of types of image processing executed by an image processing unit 71 described below. Examples of the plurality of types of image processing include soft focus processing, shading processing, combining processing, HDR processing, and saturation enhancement processing. The recording unit 6 includes, a memory card removably attached from outside of the imaging apparatus 1, a volatile memory, and a non-volatile memory. Moreover, the short movie recording unit 63 includes a plurality of albums (folders) generated for each of combinations of the types of special effect processing, the frame rate, and the moving image format.

The control unit 7 integrally controls individual components of the imaging apparatus 1. The control unit 7 controls individual components of the imaging apparatus 1 based on the signal input from the touch panel 4 or the operation signal input from the operating unit 5. The control unit 7 is formed with a central processing unit (CPU), or the like. Now, the configuration of the control unit 7 will be described in detail. The control unit 7 includes the image processing unit 71, a setting unit 72, a shooting controller 73, a thumbnail generation unit 74, a recording controller 75, and a display controller 76.

The image processing unit 71 performs predetermined image processing on the image data generated by the imaging unit 2. The predetermined image processing herein corresponds to basic image processing including at least A/D conversion processing, optical black subtraction processing, and white balance adjustment processing, and including synchronization processing of the image data, color matrix calculation processing, γ correction processing, color reproduction processing, and edge enhancement processing, when the imaging element of the imaging unit 2 is arranged in a Bayer array. Moreover, the image processing unit 71 generates a piece of moving image data by connecting a plurality of pieces of short movie data having different shooting time-points. Moreover, the image processing unit 71 executes special effect processing capable of achieving visual effects by combining a plurality of types of image processing onto image data or moving image data.

The setting unit 72 sets the first moving image mode (hereinafter, simply referred to as an "ordinary moving image mode") and the second moving image mode (hereinafter, simply referred to as a "short movie mode"). The first moving image mode generates first moving image data by causing the imaging unit 2 to continuously shoot the subject from the point of input of the start signal by the moving image switch 52 till the point of input of the finish signal. The second moving image mode generates second moving image data by causing the imaging unit 2 to continuously shoot the subject for a prescribed time-span (for example, four seconds) from the point of input of the start signal on the moving image switch 52. The second moving image mode may mutually connect a plurality of short movies (pieces of connection moving image data) generated at different shooting time-points by the imaging unit 2. Specifically, the setting unit 72 sets the moving image mode of the imaging apparatus 1 to the ordinary moving image mode or the short movie mode in accordance with the operation on the operating unit 5.

When a release signal has been input from the release switch 51, the shooting controller 73 causes the imaging unit 2 to execute still image shooting. Note that the still image shooting on the imaging unit 2 is the operation performed by the image processing unit 71, of predetermined image processing onto the image data output by the imaging unit 2. The still image data processed in this manner is recorded onto the still image data recording unit 62 under the control by the shooting controller 73. Moreover, when moving image start is input from the moving image switch 52, the shooting controller 73 causes the imaging unit 2 to start moving image shooting in the moving image mode according to the setting of the setting unit 72. Specifically, when the moving image mode of the imaging apparatus 1 is set to the ordinary moving image mode by the setting unit 72, the shooting controller 73 allows the shooting in the ordinary moving image mode to be executed, that is, causes the imaging unit 2 to shoot a moving image, in accordance with a predetermined frame rate and a moving image format, from the point of reception of the input of the start signal by the moving image switch 52 till the point of reception of the input of the finish signal by the moving image switch 52. In contrast, when the moving image mode of the imaging apparatus 1 is set to the short movie mode by the setting unit 72, the shooting controller 73 allows the shooting in the short movie mode to be executed, that is, causes the imaging unit 2 to shoot a moving image for a prescribed time-span (for example, four seconds) in accordance with the predetermined frame rate and the moving image format. The first moving image data captured in the ordinary moving image mode (hereinafter, referred to as "ordinary moving image data") undergo image processing by the image processing unit 71 and thereafter, are recorded in the moving image data recording unit 64. In contrast, the short movie shot by the short movie mode undergoes image processing by the image processing unit 71 and thereafter, is recorded on the short movie recording unit 63.

When moving image shooting by the imaging unit 2 is finished, the thumbnail generation unit 74 generates a thumbnail representing the moving image data based on the moving image data generated by the imaging unit 2. Specifically, the thumbnail generation unit 74 generates a thumbnail representing each of the ordinary moving image that corresponds to the ordinary moving image data generated in the ordinary moving image mode and a thumbnail representing the short movie moving image that corresponds to the short movie generated in the short movie mode. More specifically, the thumbnail generation unit 74 performs resize processing on the ordinary moving image data or the short movie and generates resized image data, and then, generates a thumbnail by combining the resized image data with a template having a display area that displays information indicating that a short movie having a different shooting time-point may be connected. Moreover, the thumbnail generation unit 74 generates trimming image data by performing trimming processing on the resized image that corresponds to the resized image data on the thumbnail, and performs, onto the trimming image data, resize processing of enlargement up to an area that covers a display area of the information indicating that a short movie having a different shooting time-point may be connected, and then, combines this to the template. These processes generate a first moving image thumbnail (hereinafter, referred to as an "ordinary moving image thumbnail") representing the ordinary moving image data captured in the ordinary moving image mode.

The recording controller 75 determines the frame rate and the moving image format for the short movie generated by the imaging unit 2, and records (stores) the short movie in the short movie recording unit 63, for each of the albums generated for each of the frame rate and the moving image format.

The display controller 76 controls the display form of the display unit 3. Specifically, the display controller 76 displays, on the display unit 3, the still image that corresponds to the still image data generated by the imaging unit 2. Moreover, the display controller 76 displays the thumbnails generated by the thumbnail generation unit 74 on the display unit 3 such that the thumbnails may be distinguished between the ordinary moving image mode and the short movie mode. Furthermore, the display controller 76 displays the thumbnails generated by the thumbnail generation unit 74 on the display unit 3 after adding, to the thumbnails, information that may be used to distinguish between the ordinary moving image mode and the short movie mode.

Moreover, the display controller 76 displays, on the display unit 3, a reference moving image that corresponds to the short movie shot by the imaging unit 2, and thereafter, plays back and displays, on the display unit 3, a connection moving image that corresponds to the short movie connectable with the reference moving image. Specifically, the display controller 76 repetitively plays back and displays, on the display unit 3, a connection moving image (previous moving image) that corresponds to the short movie generated by the imaging unit 2 before the latest reference moving image that corresponds to the short movie shot by the imaging unit 2, and the reference moving image (latest moving image) that corresponds to the short movie shot by the imaging unit 2. More specifically, the display controller 76 plays back and displays the reference moving image that corresponds to the short movie, and thereafter, plays back and displays, on the display unit 3, the connection moving image that corresponds to the short movie shot by the imaging unit 2.

Processing on Imaging Apparatus

Figure 2:
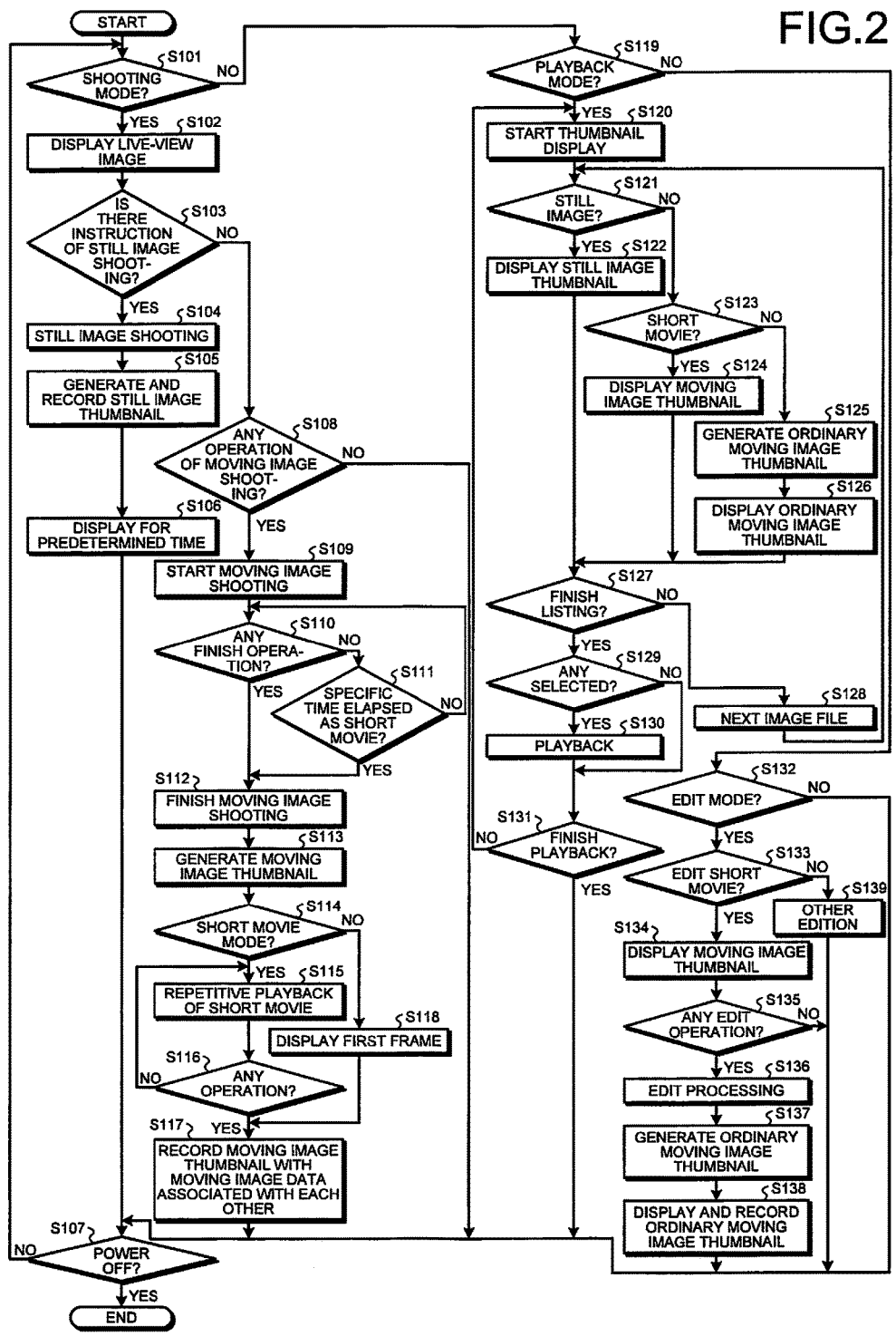
FIG. 2 is a flowchart illustrating an outline of processing executed by the imaging apparatus according to an embodiment of the present disclosure.

Next, processing executed by the imaging apparatus 1 will be described. FIG. 2 is a flowchart illustrating an outline of the processing executed by the imaging apparatus 1.

As illustrated in FIG. 2, a case where the imaging apparatus 1 is set to the shooting mode (step S101: Yes) will be described. In this case, the display controller 76 displays, on the display unit 3, a live-view image that corresponds to live-view image data continuously generated by the imaging unit 2 (step S102).

Subsequently, when still image shooting is instructed from the release switch 51 (step S103: Yes), the shooting controller 73 causes the imaging unit 2 to execute still image shooting (step S104). In this case, the image processing unit 71 performs predetermined image processing on the image data (RAW data) generated by the imaging unit 2.

Thereafter, the imaging apparatus 1 generates a still image thumbnail and records it in the still image data recording unit 62 (step S105). In this case, the thumbnail generation unit 74 generates a resize-processed thumbnail for the image data generated by the imaging unit 2, and the recording controller 75 records the thumbnail generated by the thumbnail generation unit 74, and the image data image-processed by the image processing unit 71, in association with each other, in the still image data recording unit 62.

Figure 3:
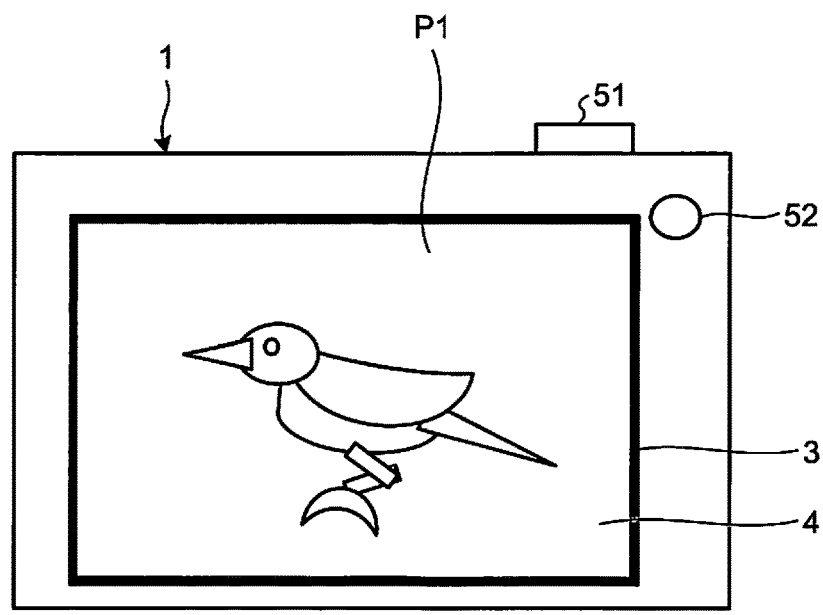
FIG. 3 is a diagram illustrating an exemplary still image displayed by a display unit of the imaging apparatus according to an embodiment of the present disclosure.

Subsequently, the display controller 76 displays the still image that corresponds to the still image data generated by the imaging unit 2 for a predetermined time-span (for example, three seconds) on the display unit 3 (step S106). Specifically, as illustrated in FIG. 3, the display controller 76 displays a still image P1 that corresponds to the still image data generated by the imaging unit 2, on the display unit 3.

Thereafter, when the power of the imaging apparatus 1 is turned off via the operating unit 5 (step S107: Yes), the imaging apparatus 1 finishes the current processing. In contrast, when the power of the imaging apparatus 1 is not turned off via the operating unit 5 (step S107: No), the imaging apparatus 1 returns to step S101.

When, in step S103, no instruction of still image shooting is received from the release switch 51 (step S103: No), the imaging apparatus 1 proceeds to step S108.

Subsequently, when there is moving image shooting operation, that is, operation of inputting a start signal from the moving image switch 52, (step S108: Yes), the shooting controller 73 starts shooting of a moving image by the imaging unit 2 (step S109). Specifically, the shooting controller 73 causes the recording unit 6 to generate a moving image file that stores the image data continuously generated by the imaging unit 2, causes the imaging unit 2 to perform moving image shooting in accordance with the predetermined frame and the moving image format, and together with this, causes the image processing unit 71 to execute image processing on the image data continuously generated by the imaging unit 2 and to record the data in the moving image file. Note that the user operates on the operating unit 5 to select and set a desired frame rate and a moving image format, thereby setting the frame rate and the moving image format onto the imaging apparatus 1.

Thereafter, when there is finish operation, that is, operation of inputting the finish signal from the moving image switch 52 (step S110: Yes), the imaging apparatus 1 proceeds to step S112 described below. In contrast, when no finish operation of the moving image is performed onto the moving image switch 52 (step S110: No), the imaging apparatus 1 proceeds to step S111 described below.

In step S111, the control unit 7 judges whether a specific time has elapsed, as a short movie, for the moving image of the imaging apparatus 1. When the control unit 7 judges that the specific time has elapsed, as a short movie, for the moving image of the imaging apparatus 1 (step S111: Yes), the imaging apparatus 1 proceeds to step S112 described below. In contrast, when the control unit 7 judges that the specific time has not elapsed, as a short movie, for the moving image of the imaging apparatus 1 (step S111: No), the imaging apparatus 1 returns to step S110.

Figure 4:
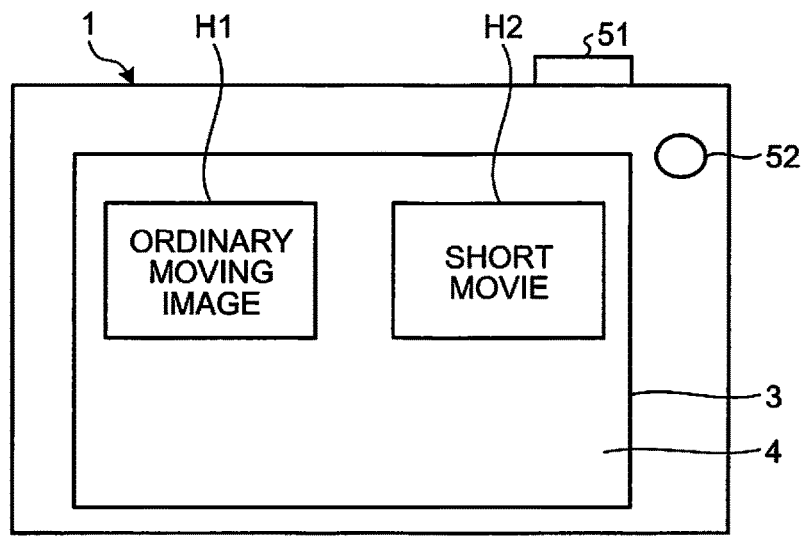
FIG. 4 is a diagram schematically illustrating an outline of setting a moving image of the imaging apparatus according to an embodiment of the present disclosure, to a short movie mode.

FIG. 4 is a diagram schematically illustrating an outline of setting a moving image of the imaging apparatus 1 to a short movie mode. As illustrated in FIG. 4, when the operating unit 5 is operated and an instruction signal for setting the mode of a moving image has been input, the display controller 76 displays, on the display unit 3, an ordinary moving image icon H1 to set an ordinary moving image, and a short movie icon H2 to set the short movie mode. The user operates the cross switch 53 on the operating unit 5, selects the short movie icon H2, and operates the OK switch 54, thereby setting the moving image mode of the imaging apparatus 1 to the short movie mode or the ordinary moving image mode. Note that the ordinary moving image mode and the short movie mode are set onto the imaging apparatus 1 by user's operation on the operating unit 5 before starting moving image shooting.

Figure 5:
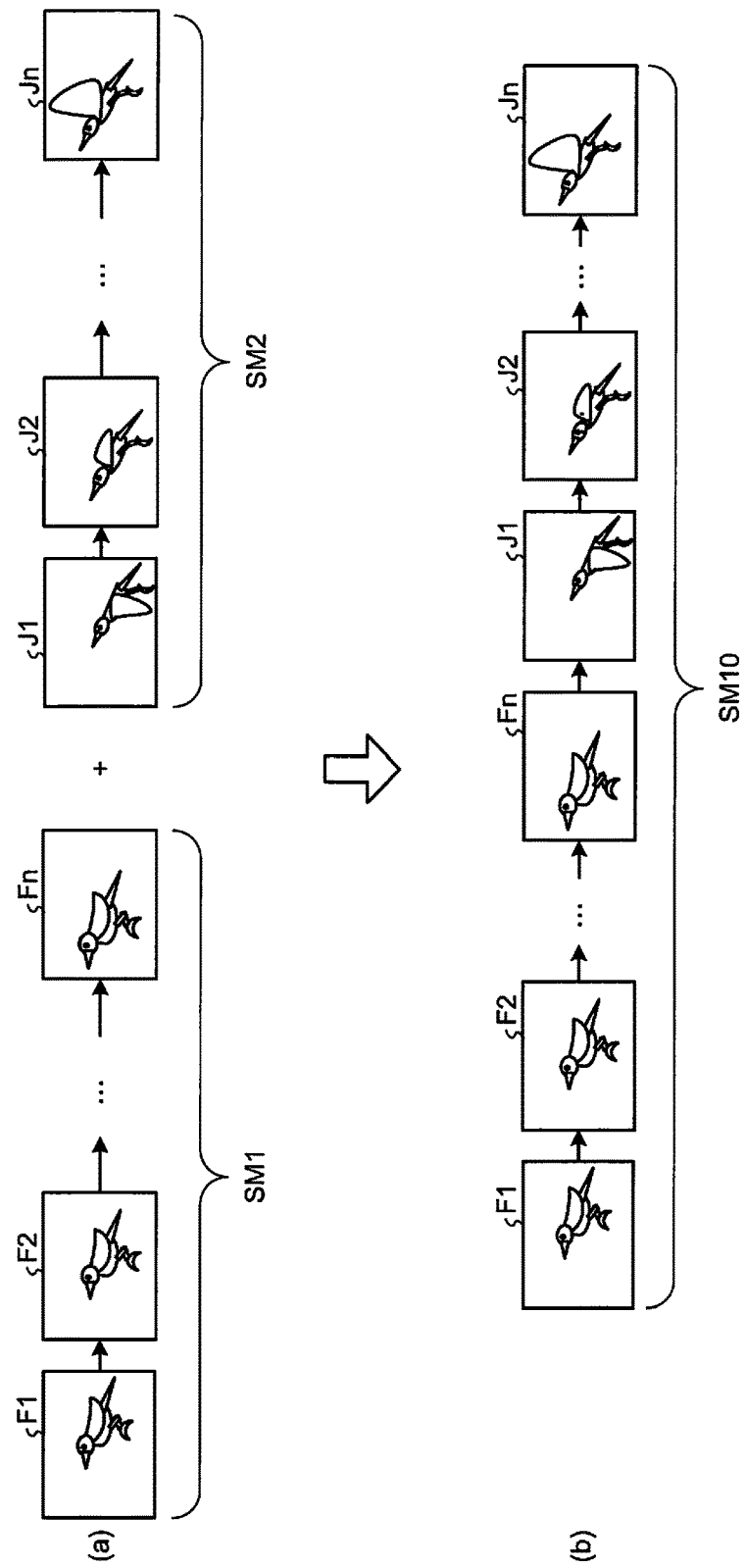
FIG. 5 is a diagram schematically illustrating an outline of a short movie executed by the imaging apparatus according to an embodiment of the present disclosure.

Note that the ordinary moving image is a mode of starting recording of moving image data by operation on the moving image switch 52 and finishing the recording of the moving image data when the moving image switch 52 is operated again. Moreover, the short movie mode is a mode of recording moving image data for a prescribed specific time (for example, four seconds) when the user presses the moving image switch 52 once. In this mode, the previously-shot short movie and the latest (current) short movie, having same special effect processing, the frame rate and the type of moving image format, are connected with each other to form one piece of moving image data. Specifically, as illustrated in FIG. 5, when the short movies have the same frame rate and the same type of moving image format, the short movies with the identical frame rate and the type of moving image format are made into one piece of moving image data SM10 by connecting a previously shot short movie SM1 (frame F1→F2→ . . . →Fn (n: integer of three or more) with a latest short movie SM2 (frame J→J2→ . . . →Jn (n: integer of three or more) (FIG. 5(a)→FIG. 5(b)). In this case, the image processing unit 71 generates one piece of moving image data SM10 by connecting the short movie SM1 with the short movie SM2. This processing makes an impressive and diversified moving image beyond imagination by joining pieces of moving image data of short time-spans with different scenes, with each other. Note that while, for simplification, merely short movies are joined with each other in the description of this exemplary case, there are also cases where an ordinary moving image or a still image comes before and/or after the short movie, and where still images are continuously played back. For example, similar concepts may be applied to a case where still images are continuously played back as a slide show.

Returning to FIG. 2, description of step S112 or later will be continued.

In step S112, the shooting controller 73 finishes moving image shooting by the imaging unit 2 (step S112).

Subsequently, the thumbnail generation unit 74 generates a moving image thumbnail (step S113) based on the image data for a first frame among the image data of a plurality of frames constituting the moving image data.

Figure 6:
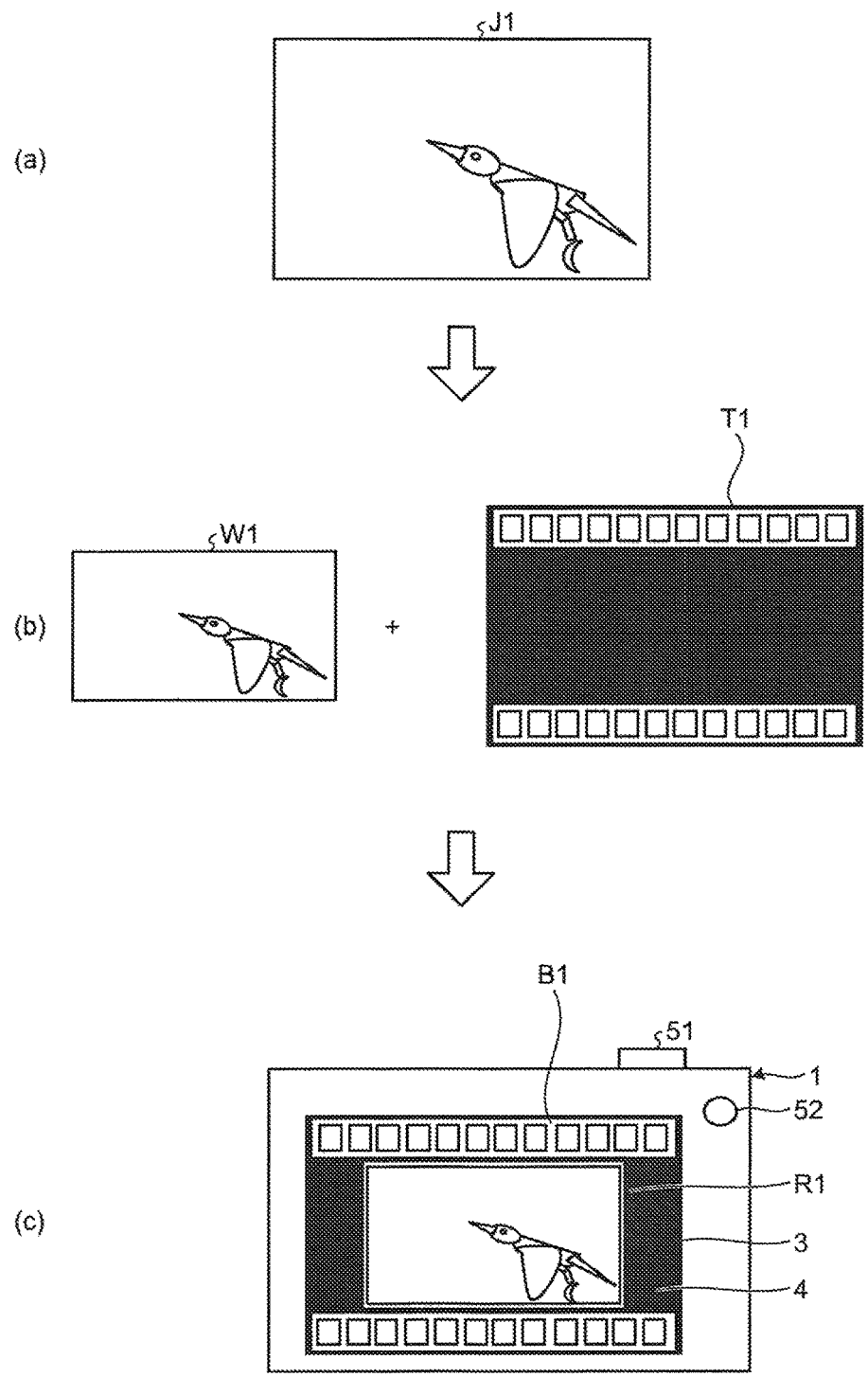
FIG. 6 is a diagram schematically illustrating a method for generating a moving image thumbnail generated by a thumbnail generation unit of the imaging apparatus according to an embodiment of the present disclosure.

FIG. 6 is a diagram schematically illustrating a method for generating the moving image thumbnail generated by the thumbnail generation unit 74. As illustrated in FIG. 6, the thumbnail generation unit 74 generates a resized image W1 by performing resize processing of reducing a display area and image data, on a first frame J1 among a plurality of frames of image data constituting the moving image data, and then, generates a moving image thumbnail B1 by combining the resized image W1 with a template T1 recorded in the recording unit 6 (FIG. 6(a)→FIG. 6(b)→ FIG. 6(c)). Note that the template T1 includes a display area R1 (overlap width area) in which information indicating that a short movie having a different shooting time-point may be connected. The thumbnail generation unit 74 generates the moving image thumbnail B1 by combining the resized image W1 with the template T1 such that their centers match with each other. This process forms the display area R1 on both ends of the resized image W1. As a result, this enables the user to intuitively grasp that another short movie having a different shooting time-point may be connected. Note that, in the present embodiment, the above-described moving image thumbnail is generated even when the data are the moving image data captured in the ordinary moving image mode. Moreover, while in the present embodiment, the information indicating that the short movie having a different shooting time-point may be connected is represented in solid black, the information may be represented by a text, a figure, or the like. Furthermore, the information indicating that short movie having a different shooting time-point may be connected may be a duplication of a portion of the image or the resized image W1.

Thereafter, when the moving image mode of the imaging apparatus 1 is set to the short movie mode (step S114: Yes), the display controller 76 repetitively plays back and displays, on the display unit 3, the moving image that corresponds to the short movie shot by the imaging unit 2 (step S115).

Figure 7:
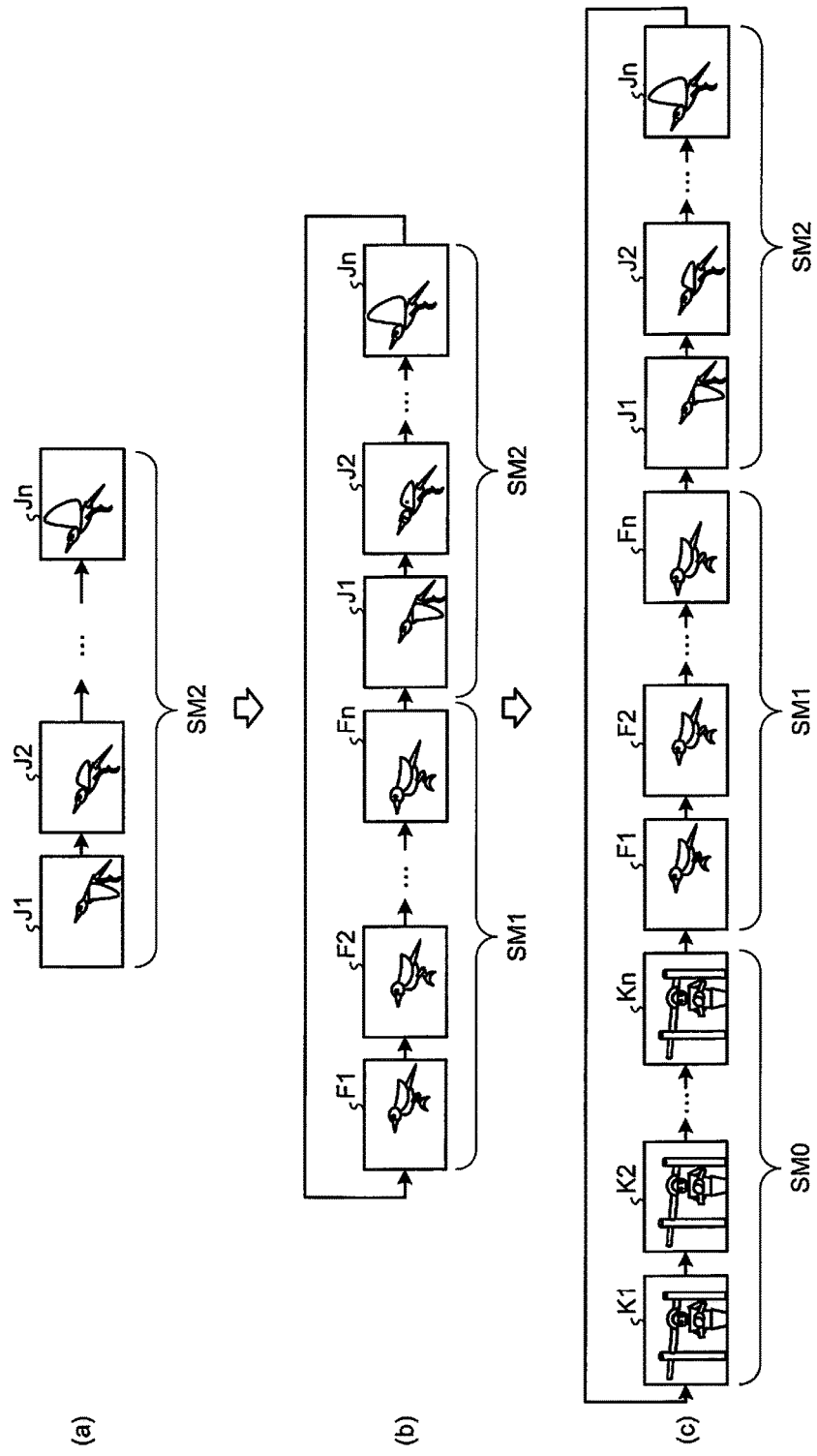
FIG. 7 is a diagram illustrating an exemplary confirmation display of the short movie executed by the imaging apparatus according to an embodiment of the present disclosure.

FIG. 7 is a diagram illustrating an exemplary confirmation display of the short movie executed by the imaging apparatus 1. As illustrated in FIG. 7, the display controller 76 repetitively plays back and displays, on the display unit 3, the moving image SM1 that corresponds to the short movie generated by the imaging unit 2 before the latest short movie SM2 that corresponds to the short movie shot by the imaging unit 2, and the latest moving image SM2 that corresponds to the short movie shot by the imaging unit 2.

Specifically, the display controller 76 plays back and displays the short movie SM1 (F1→F2→ . . . →Fn) generated by the imaging unit 2 before the latest short movie SM2, and thereafter, plays back and displays the latest short movie SM2 (frames J1→J2→ . . . →Jn) shot by the imaging unit 2, on the display unit 3 (FIG. 7(a)→FIG. 7(b)). Thereafter, when the number of times of the playback of the short movie SM1 and the short movie SM2 exceeds a predetermined number of times (for example, three times), a short movie SM0 (frames K1→K2→ . . . →Kn) generated by the imaging unit 2 before the short movie SM1 is played back and displayed on the display unit 3, and thereafter, the short movie SM1 and the short movie SM2 are displayed on the display unit 3 in an order of playback of these movies (FIG. 7(b)→FIG. 7(c)). This enables the user to intuitively grasp the joining state of the content of the latest short movie that has been shot with the short movie shot previous to the latest short movie.

Under the situation illustrated in FIG. 7, when the operating unit 5 has received an input of an instruction signal indicating the order of playback of the short movie SM0, the short movie SM1, and the short movie SM2, the display controller 76 displays, on the display unit 3, the short movie SM0, the short movie SM1, and the short movie SM2, in a modified playback order in accordance with the instruction signal from the operating unit 5. For example, when the cross switch 53 is operated and the display controller 76 has received an input of an instruction signal indicating the order of playback of the short movie SM0, the short movie SM1, and the short movie SM2, the display controller 76 displays, on the display unit 3, the short movie SM0, the short movie SM1, and the short movie SM2, in a modified playback order in accordance with the instruction signal from the operating unit 5. Under this situation, when the OK switch 54 is operated and the OK switch 54 has received an input of the stop signal that stops the playback of the reference moving image, the image processing unit 71 generates connected image data by connecting the short movie SM0 to the short movie SM2 in the order of playback of the short movie SM0, the short movie SM1, and the short movie SM2. For example, the image processing unit 71 generates a connection moving image data by connecting the short movie SM0, the short movie SM2, and the short movie SM1 in this order and records the generated data in the short movie recording unit 63. This processing enables the user to easily perform edit operation of the short movies while viewing the joining state of other short movies immediately after the shooting.

Note that while, in FIG. 7, the display controller 76 plays back and displays the short movie SM2 after playing back and displaying the short movie SM1, it is also allowable to play back and display, for example, the short movie SM1 and the short movie SM2 to be arranged in parallel on the display unit 3, and also allowable to reduce the display area of the short movie SM1 and superpose the short movie SM1 with the reduced display area onto the short movie SM2 to be played back and displayed on the display unit 3. In any case, it is possible to have an advantage that when the shooting fails at confirmation, it is possible to delete what was shot and immediately perform shooting again, and thus, to enhance the quality of the entire images that have been shot.

Moreover, in FIG. 7, when the processing of playing back and displaying the short movie SM2 (reference moving image) on the display unit 3 is repetitively performed after the display controller 76 plays back and displays the short movie SM1 (connection moving image) on the display unit 3, and when the operating unit 5 receives an input of a deletion signal that prohibits connection of the short movie SM1 with the short movie SM2 and that deletes the short movie SM2, the image processing unit 71 may stop connection of the short movie SM1 (connection moving image) with the short movie SM2 (reference moving image) and may delete the short movie SM2 (reference moving image) from the recording unit 6. With this processing, it is possible to have an advantage that when the shooting fails at confirmation, it is possible to delete what was shot and immediately perform shooting again, and thus, to enhance the quality of the entire images that have been shot. Furthermore, it is possible to achieve association with the short movie SM1. For comparison, in the known art, the latest moving image data are automatically connected to the previous moving image data regardless of the content of each of pieces of the moving image data. Accordingly, even when the user desires to associate the previous moving image data with the latest moving image data and to form one piece of moving image data, it is difficult to confirm the joining state between the previous moving image data and the latest moving image data, and thus, it is difficult to achieve association between these pieces of data. In contrast, according to an embodiment of the present disclosure, it is possible to confirm the image just captured, and to immediately confirm the image in comparison with the already obtained image.

Subsequently, when the operating unit 5 has been operated (step S116: Yes), the imaging apparatus 1 proceed to step S117 described below. In contrast, when the operating unit 5 has not been operated (step S116: No), the imaging apparatus 1 returns to step S115.

In step S117, the recording controller 75 associates the moving image thumbnail generated by the thumbnail generation unit 74 with the moving image data image-processed by the image processing unit 71, and records this on the recording unit 6. In this case, the recording controller 75 associates the moving image thumbnail with the moving image data and records this in the moving image data recording unit 64 when the moving image mode of the imaging apparatus 1 is set to the ordinary moving image mode, while the recording controller 75 associates the moving image thumbnail with the moving image data and records this in the short movie recording unit 63 when the moving image mode of the imaging apparatus 1 is set to the short movie mode. After step S117, the imaging apparatus 1 proceeds to step S107.

In step S114, when the moving image mode of the imaging apparatus 1 is not set to the short movie mode (step S114: No), the display controller 76 displays a first frame (for example, refer to a frame F1 in FIG. 5) of a moving image that corresponds to the moving image data of the ordinary moving image captured by the imaging unit 2, for a predetermined time (for example, three seconds) on the display unit 3 (step S118). After step S118, the imaging apparatus 1 proceeds to step S117.

When, in step S108, moving image shooting operation of inputting a start signal from the moving image switch 52 has not been performed (step S108: No), the imaging apparatus 1 proceeds to step S107.

Next, a case where the imaging apparatus 1 is not set to the shooting mode (step S101: No) and the imaging apparatus 1 is set to the playback mode (step S119: Yes) will be described. At this time, the display controller 76 starts thumbnail display, that is, sequentially displaying a still image thumbnail or a moving image thumbnail corresponding to the image data or moving image data recorded in the recording unit 6, onto the display unit 3 (step S120).

Subsequently, when the image file for displaying the thumbnail is a still image (step S121: Yes), the display controller 76 displays the still image thumbnail recorded in the image file, onto the display unit 3 (step S122). After step S122, the imaging apparatus 1 proceeds to step S127 described below.

When, in step S121, the image file for displaying the thumbnail is not a still image (step S121: No), the imaging apparatus 1 proceeds to step S123.

Subsequently, the moving image data recorded in the image file for displaying the thumbnail is a short movie (step S123: Yes), the display controller 76 displays a moving image thumbnail for the short movie (for example, refer to FIG. 6(*c*)) on the display unit 3 (step S124). After step S124, the imaging apparatus 1 proceeds to step S127.

When, in step S123, the moving image data recorded in the image file for displaying the thumbnail is not a short movie (step S123: No), the thumbnail generation unit 74 generates an ordinary moving image thumbnail based on the moving image thumbnail recorded on the image file (step S125).

Figure 8:
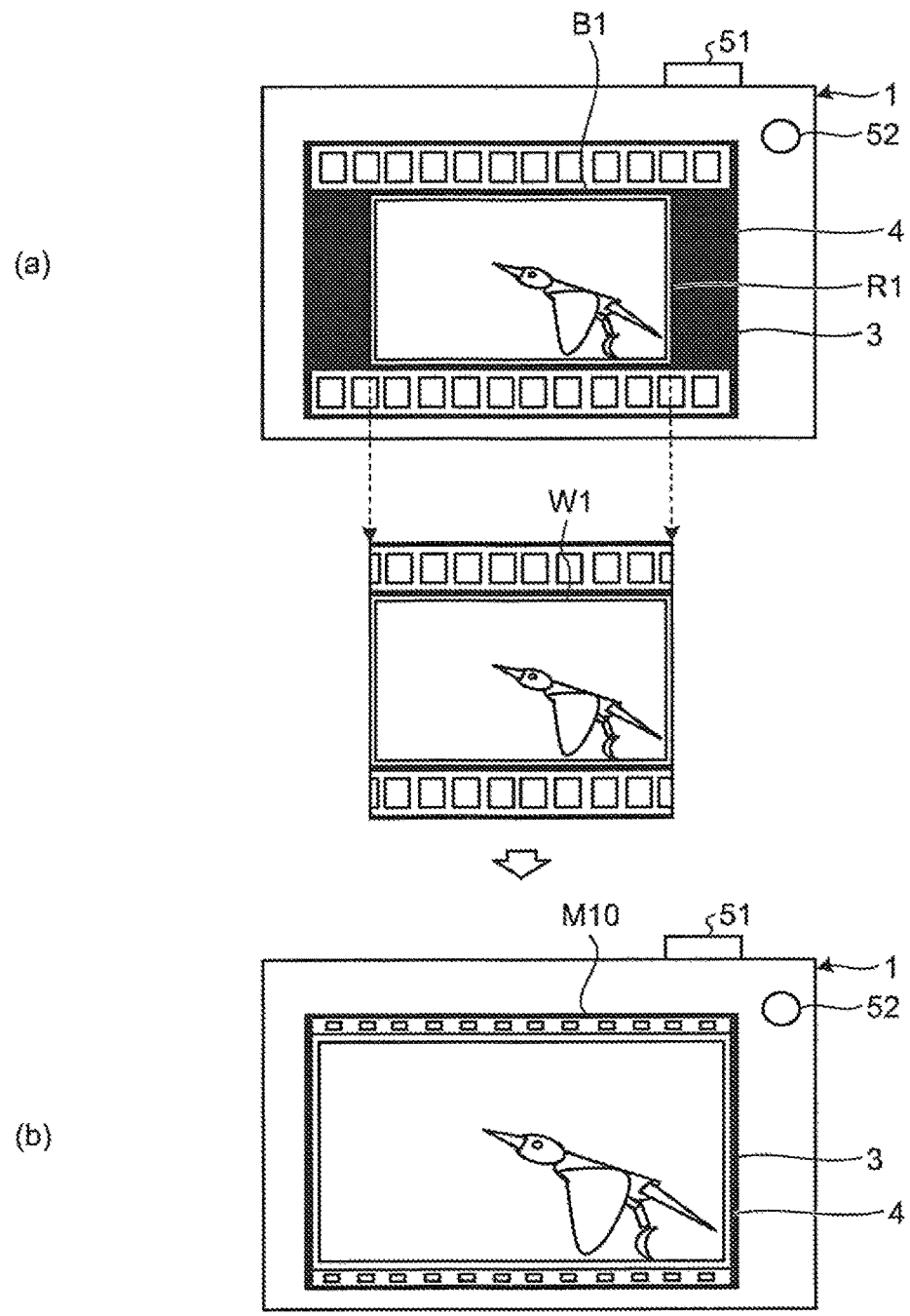
FIG. 8 is a diagram schematically illustrating a method for generating an ordinary moving image thumbnail generated by the thumbnail generation unit of the imaging apparatus according to an embodiment of the present disclosure.

FIG. 8 is a diagram schematically illustrating a method for generating an ordinary moving image thumbnail generated by the thumbnail generation unit 74. As illustrated in FIG. 8, the thumbnail generation unit 74 performs trimming processing on an area including the resized image W1 of the moving image thumbnail B1, cuts out this area, and generates an ordinary moving image thumbnail M10 by performing, onto the resized image W1, resize processing of enlargement up to the area that covers the display area R1 indicating that it is possible to connect with another short movie having a different shooting time-point (FIG. 8(*a*)→FIG. 8(*b*)). This processing makes it possible to simplify processing (recording processing) at the shooting by using one moving image thumbnail for more than once. Furthermore, since the display form differs between the moving image thumbnail and the ordinary moving image thumbnail, the user may further intuitively grasp the short movie and the ordinary moving image. Moreover, when the user switches the short movie to the ordinary moving image by operating the operating unit 5 or the touch panel 4, the thumbnail generation unit 74 may perform trimming processing on an area including the resized image W1 of the moving image thumbnail B1, cut out this area, and may generate the ordinary moving image thumbnail M10 by performing, onto the resized image W1, resize processing of enlargement up to the area that covers the display area R1 indicating that it is possible to connect with another short movie having a different shooting time-point.

Subsequently, the display controller 76 displays the ordinary moving image thumbnail generated by the thumbnail generation unit 74, on the display unit 3 (step S126). After step S126, the imaging apparatus 1 proceeds to step S127.

Figure 9:
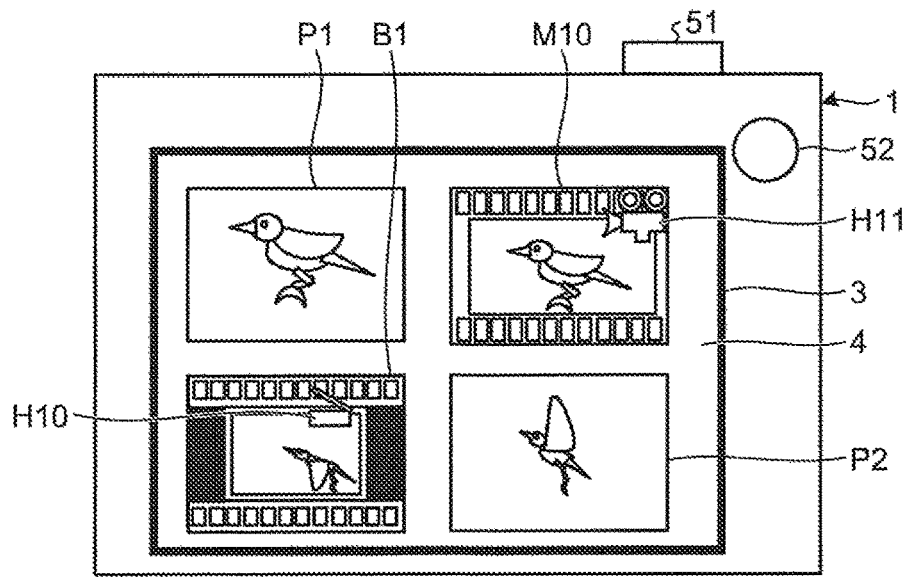
FIG. 9 is a diagram illustrating an exemplary thumbnail display displayed by the display unit of the imaging apparatus according to an embodiment of the present disclosure.

Thereafter, the control unit 7 judges whether listing of the thumbnail display is finished (step S127). Specifically, as illustrated in FIG. 9, the control unit 7 judges whether the listing of the thumbnail display is finished by judging whether a predetermined number of (for example, four or 25) thumbnails (still image thumbnail P1, still image thumbnail P2, moving image thumbnail B1, and ordinary moving image thumbnail M10) are displayed in the display area of the display unit 3. In this case, the display controller 76 displays an icon H10 and an icon H11 as information that may be used to distinguish the moving image thumbnail B1 from the ordinary moving image thumbnail M10, on the display unit 3, by superposing the icons onto the individual display areas of the moving image thumbnail B1 and the ordinary moving image thumbnail M10. This processing makes it possible to further intuitively grasp the short movie and the ordinary moving image. When the control unit 7 judges that listing of the thumbnail display is finished (step S127: Yes), the imaging apparatus 1 proceed to step S129 described below. In contrast, when the control unit 7 judges that listing of the thumbnail display is not finished (step S127: No), the control unit 7 obtains a next image file from the recording unit 6 in order to display the next thumbnail (step S128). After step S128, the imaging apparatus 1 returns to step S121.

When, in step S129, the operating unit 5 has been operated and any one of the plurality of thumbnails displayed by the display unit 3 is selected (step S129: Yes), the display controller 76 plays back and displays the image file that corresponds to the selected thumbnail, on the display unit 3 (step S130). In this case, when the user switches the short movie to the ordinary moving image by operating the operating unit 5 or the touch panel 4, the thumbnail generation unit 74 may perform trimming processing on an area including the resized image W1 of the moving image thumbnail B1, cut out this area, and may generate the ordinary moving image thumbnail M10 by performing, onto the resized image W1, resize processing of enlargement up to the area that covers the display area R1 indicating that it is possible to connect with another short movie having a different shooting time-point. In addition, the recording controller 75 may associate the ordinary moving image thumbnail M10 generated by the thumbnail generation unit 74 with the short movie selected via the operating unit 5 or the touch panel 4 and may record them in the moving image data recording unit 64 as the ordinary moving image data. Furthermore, the recording controller 75 may delete the short movie that has been switched to the ordinary moving image data, from the album of the short movie recording unit 63. After step S130, the imaging apparatus 1 proceeds to step S131.

Subsequently, when the operating unit 5 is operated and the playback mode is going to be finished (step S131: Yes), the imaging apparatus 1 proceeds to step S107. In contrast, when the operating unit 5 has not been operated (step S131: No) and the playback mode is not going to be finished, the imaging apparatus 1 returns to step S120.

When, in step S129, the operating unit 5 has not been operated and any one of the plurality of thumbnails displayed by the display unit 3 has not been selected (step S129: No), the imaging apparatus 1 proceeds to step S131.

Next, a case where the imaging apparatus 1 is not set to the shooting mode (step S101: No) and the imaging apparatus 1 is not set to the playback mode (step S119: No) will be described. At this time, the imaging apparatus 1 proceeds to step S132.

Subsequently, when the imaging apparatus 1 is set to the edit mode (step S132: Yes), the imaging apparatus 1 proceeds to step S133 described below. In contrast, when the imaging apparatus 1 is not set to the edit mode (step S132: No), the imaging apparatus 1 proceeds to step S107.

Figure 10:
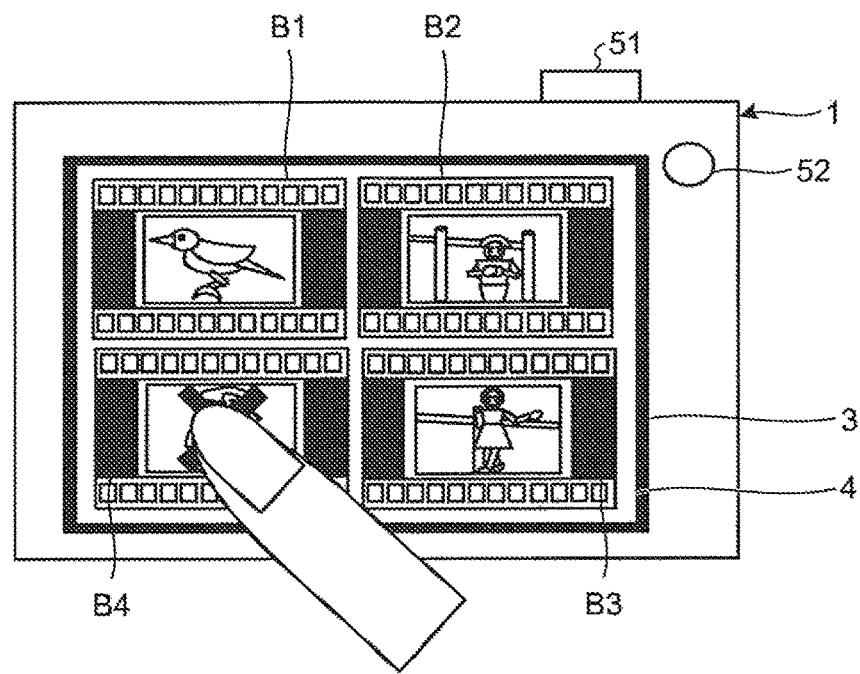
FIG. 10 is a diagram illustrating an exemplary moving image thumbnail display displayed by the display unit of the imaging apparatus according to an embodiment of the present disclosure.
Figure 11:
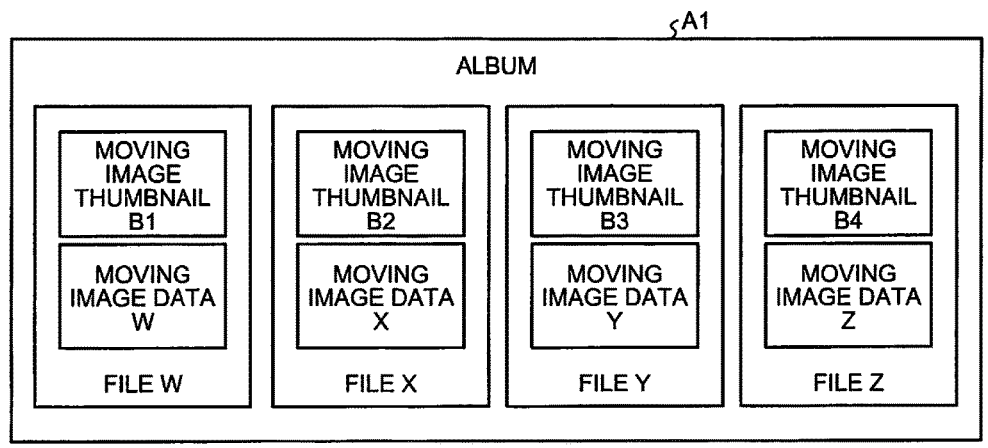
FIG. 11 is a diagram schematically illustrating a short movie file for each of albums recorded by a recording unit of the imaging apparatus according to an embodiment of the present disclosure.

When, in step S133, a plurality of short movies are going to be edited (step S133: Yes), the display controller 76 displays a moving image thumbnail that corresponds to each of the plurality of short movies, on the display unit 3 (step S134). Specifically, as illustrated in FIG. 10, the display controller 76 displays moving image thumbnails B1 to B4 that correspond to the plurality of short movies, on the display unit 3. In this case, the display controller 76 displays, on the display unit 3, the moving image thumbnails of the short movies recorded in each of the albums generated for individual frame rates and moving image formats in the short movie recording unit 63. For example, as illustrated in FIG. 11, the display controller 76 displays, on the display unit 3, the moving image thumbnails B1 to B4 of the short movie files W to Z recorded in an album A1 generated for individual frame rates and moving image formats in the short movie recording unit 63. The moving image thumbnails B1 to B4 and pieces of moving image data W to Z as short movies are recorded in the individual files W to Z, respectively.

Figure 12:
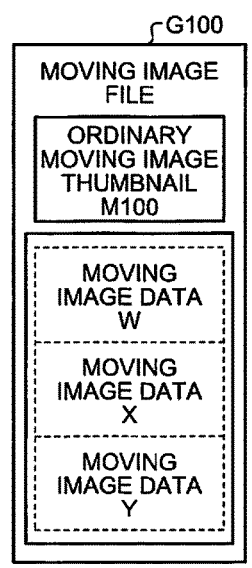
FIG. 12 is a diagram schematically illustrating a moving image file generated by joining a plurality of short movies by an image processing unit of the imaging apparatus according to an embodiment of the present disclosure.

Subsequently, when short movie edit operation is performed by the operation of the touch panel 4 or the operating unit 5 (step S135: Yes), the image processing unit 71 executes short movie edit processing (step S136). Specifically, as illustrated in FIGS. 11 and 12, the image processing unit 71 executes moving image processing, that is, processing of connecting pieces of the moving image data W to Y respectively recorded in the files W to Y corresponding to the plurality of short movies selected by the touch panel 4 or the operating unit 5 among the plurality of moving image thumbnails displayed on the display unit 3. In this case, the image processing unit 71 connects the moving images in the order of older shooting time-point. Of course, the image processing unit 71 may change the order of connecting the moving images in accordance with the operation of the operating unit 5 or the touch panel 4, and may connect the selected short movie with the moving image data of the short movie in another album.

Figure 13:
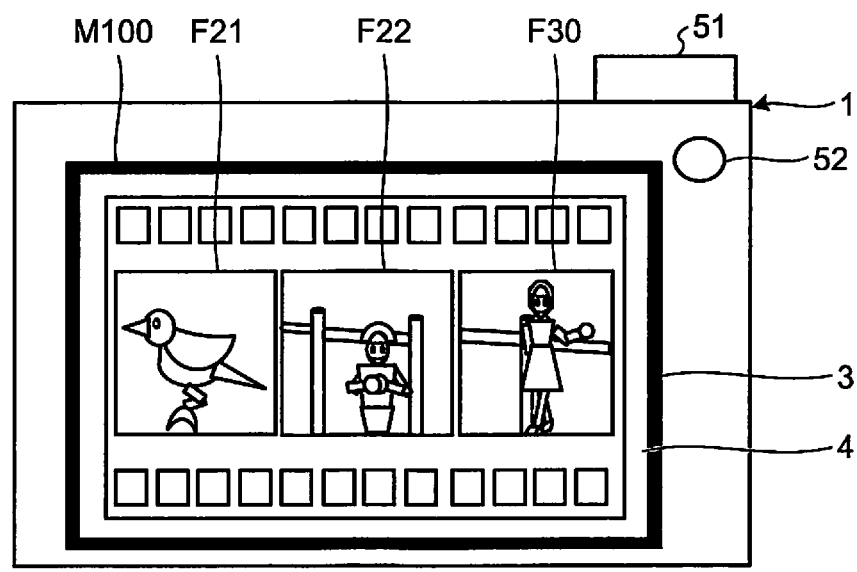
FIG. 13 is a diagram illustrating an exemplary ordinary moving image thumbnail displayed by the display unit of the imaging apparatus according to an embodiment of the present disclosure.

Thereafter, the thumbnail generation unit 74 generates an ordinary moving image thumbnail (step S137). Specifically, as illustrated in FIG. 13, the thumbnail generation unit 74 generates an ordinary moving image thumbnail M100 based on at least first short movie frame data F21, intermediate short movie frame data F22 and last short movie frame data F30 among the moving image thumbnails of the plurality of short movies connected by the image processing unit 71. Note that the thumbnail generation unit 74 may generate the ordinary moving image thumbnail M100 based on the moving image thumbnails B1 to B3 of the short movie illustrated in FIG. 10.

Subsequently, the display controller 76 displays the ordinary moving image thumbnail generated by the thumbnail generation unit 74, on the display unit 3 (step S138). Specifically, as illustrated in FIG. 13, the display controller 76 displays the ordinary moving image thumbnail M100 generated by the thumbnail generation unit 74, on the display unit 3. In this case, the image processing unit 71 generates a moving image file G100 (refer to FIG. 12) that associates the moving image data (moving image data W to Y) formed by connecting short movies, with the ordinary moving image thumbnail M100 generated by the thumbnail generation unit 74, and records this moving image file G100 in the moving image data recording unit 64. This processing makes it possible for the user to intuitively grasp the content of the moving image data formed by connecting the short movies. After step S138, the imaging apparatus 1 proceeds to step S107.

When, in step S135, no short movie edit operation is performed (step S135: No), the imaging apparatus 1 proceeds to step S107.

When, in step S133, a plurality of short movies is not going to be edited (step S133: No), the imaging apparatus 1 performs other edition (step S139). For example, the imaging apparatus 1 performs processing such as trimming processing on a still image that corresponds to the still image data recorded in the still image data recording unit 62, image processing of changing contrast, saturation, or hue, deletion processing of deleting still image data and moving image data from the recording unit 6. After step S139, the imaging apparatus 1 proceeds to step S107.

According to above-described one embodiment of the present disclosure, the display controller 76 distinguishably displays, on the display unit 3, the thumbnail of the ordinary moving image that corresponds to the ordinary moving image data generated by the thumbnail generation unit 74 in the ordinary moving image mode, and the thumbnail of the short movie moving image that corresponds to the short movie generated in the short movie mode. As a result, it is possible to intuitively grasp whether the data are connectable moving image data.

Moreover, according to one embodiment of the present disclosure, when a plurality of thumbnails is displayed as a list on the display unit 3, the display controller 76 adds to the thumbnails, information that may be used to distinguish between the ordinary moving image mode and the short movie mode, specifically, the ordinary moving image icon H1, and the short movie icon H2, and displays the information-added thumbnails on the display unit 3. As a result, it is possible to intuitively grasp whether the data are connectable moving image data.

Moreover, according to one embodiment of the present disclosure, the thumbnail generation unit 74 performs resize processing on initial frame data of the ordinary moving image data or the short movie and generates resized image data, and then, generates a moving image thumbnail by combining the resized image data with a template including information indicating that a short movie having a different shooting time-point may be connected. This processing generates solely one single moving image thumbnail regardless of the ordinary moving image mode and the short movie mode, making it possible to simplify the processing of the imaging apparatus 1 at recording and to reduce file capacity.

Moreover, according to one embodiment of the present disclosure, when the short movie is going to be changed to the ordinary moving image, the thumbnail generation unit 74 generates trimming image data by performing trimming processing on the area including the resized image that corresponds to the resized image data on the moving image thumbnail, and performs resize processing of enlargement up to an area that covers a display area on the trimming image data, thereby generating an ordinary moving image thumbnail representing the ordinary moving image data captured in the ordinary moving image mode. This processing would not need generation of the thumbnail for each of modes at shooting, and thus, it is possible to simplify the processing of the imaging apparatus 1 and to reduce file capacity.

Moreover, according to one embodiment of the present disclosure, in case where a plurality of short movies having different shooting time-points is connected with each other by the image processing unit 71, the thumbnail generation unit 74 generates a combined thumbnail that combines at least each of the thumbnail of the first short movie and the thumbnail of the last short movie among the plurality of short movies, and the display controller 76 displays the combined thumbnail generated by the thumbnail generation unit 74, on the display unit 3. As a result, the user may intuitively grasp the content of the connected short movies.

Moreover, according to one embodiment of the present disclosure, the display controller 76 plays back and displays a short movie previous to the latest short movie generated by the imaging unit 2, and the latest short movie, on the display unit 3. As a result, it is possible to intuitively grasp the joining state between the previous short movie and the latest short movie.

Moreover, according to one embodiment of the present disclosure, the display controller 76 plays back and displays a previous short movie on the display unit 3 and thereafter, plays back and displays the latest short movie on the display unit 3. As a result, it is possible to intuitively grasp the joining state between the previous short movie and the latest short movie, and to obtain one piece of moving image data having the previous short movie and the latest short movie being associated with each other.

Moreover, according to one embodiment of the present disclosure, when the display unit 3 is playing back and displaying the previous short movie and the latest short movie and when an input of a modification signal to change the order of playback of each of the previous short movie and the latest short movie has been received from the operating unit 5, the display controller 76 changes the order of playback of each of the previous short movie and the latest short movie and displays the movies on the display unit 3. Accordingly, it is possible to perform edit operation of the short movies immediately after the shooting. Herein, description has been given using a short movie for which confirmation may be performed in a short time. This is, however, also applicable to ordinary movie shooting and connection confirmation. Even when the movie is not short, it is possible to perform confirmation in a fast-forwarding state or a digest confirmation state, and thus, the description is not limited to the short movie. Moreover, it is allowable to digest the image to be connected and confirm the digested image. Moreover, even in shooting performed on the assumption that still images are continuously played back as a slide show, viewing an image with its previous image in comparison or in contrast would be an important confirmation point. Accordingly, the concept may be applied to "confirmation on what has been shot" and "confirmation on merely the connecting portion" including the above, and confirmation method and planning that satisfy two aspects of "confirmation on the shooting itself" and "confirmation on joining" according to the present application would be applicable. There is an advantage of being able to delete the previous shot and immediately retry shooting when the confirmation result is a failure.

OTHER EMBODIMENTS

Moreover, the imaging apparatus according to the present disclosure may be applied not only to digital still cameras, but also to other electronic devices such as a digital video camera, a tablet-type mobile device having an imaging function, and a display device that displays an image that corresponds to medical or industrial image data captured by an endoscope and a microscope. The present disclosure would be of importance in a case, for example, where two images are continuously compared with each other, and thus, would be a very convenient concept particularly in the application where a difference in movement is confirmed immediately after shooting. When there is a need to confirm the difference in an already captured reference image (this need not be a previous image as in the embodiment, but may be a sample image. Comparison is possible with an already obtained image even when it is not a captured image), an application in which a step of first determining whether the currently captured image is properly captured and a next step of performing comparison with the previous reference image are sequentially executed may be utilized in various areas. In this case, the image is not limited to a moving image, and even for a still image when there is a step of confirming comparison with the reference image in addition to the confirmation of the captured image itself, this would be a method of confirmation that may give the feeling of advantage to the user. It is preferable that confirmation may be performed immediately after the shooting, and before the next shooting. Note that transition from the confirmation display for the shooting itself to the confirmation display for joining determination may be performed with various methods, and may be performed at a time after a specific time has elapsed, after a specific number of times of replay, or at a time of specific operation.

Moreover, a program to be executed by the imaging apparatus according to the present disclosure is provided as file data of an installable format or executable format, by being recorded in a computer readable recording medium, such as a CD-ROM, a flexible disk (FD), a CD-R, a digital versatile disk (DVD), a USB medium, and a flash memory.

A program to be executed by the imaging apparatus according to the present disclosure may be configured to be stored on a computer connected to a network such as the Internet and provided by allowing the program to be downloaded via the network. Furthermore, a program to be executed by the imaging apparatus according to the present disclosure may be configured to be provided or distributed via a network such as the Internet.

In the flowcharts in this description, context of the processes among the steps is described by using expressions such as "first", "thereafter", and "subsequently", but the sequences of the processes needed for implementing the present disclosure are not intended to be uniquely defined by these expressions. In other words, the order of processing in the flowcharts described herein may be changed within a range implementable without contradiction.

In this manner, the present disclosure in its broader aspects is not limited to the representative embodiments described herein. Accordingly, various modifications may be made without departing from the spirit or scope of the general inventive concept as defined by the appended claims and their equivalents.

Additional Item 1

An imaging method executed by an imaging apparatus including:

an imaging unit capable of continuously imaging a subject and generating moving image data of the subject;

a display unit capable of displaying a moving image that corresponds to the moving image data; and an operating unit configured to receive an input of a start signal that causes the imaging unit to start generation of the moving image data, the imaging method including:

a first display step of displaying, on the display unit, a reference moving image that corresponds to the moving image data immediately after being captured and generated by the imaging unit;

a second display step of displaying, on the display unit, a connection moving image that corresponds to connection moving image data connectable with the reference moving image, after playback of the reference moving image;

a reception step of receiving, via the operating unit, an input of a deletion signal that prohibits connection of the connection moving image with the reference moving image and deletes the reference moving image; and a deletion step of deleting the reference moving image from a recording medium or a recording unit when an input of the deletion signal has been received in the reception step.

According to the additional item 1, a technical concept that is to be covered by the present application includes an imaging method including a step of confirming a shooting result itself immediately after shooting, and a step of confirming an effect at connection playback, being provided immediately after shooting and prior to a next shooting, and capable of enhancing completion degree of each of images and connections by immediately retrying shooting when the shooting is a failure.

According to the present disclosure, it is possible to achieve an effect of being able to intuitively grasp whether the data are connectable moving image data.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
    an imaging unit configured to continuously image a subject and generate moving image data of the subject;
    a display unit configured to display a moving image corresponding to the moving image data;
    a shooting controller configured to control the imaging unit to continuously image the subject in a moving image mode capable of connecting different pieces of the moving image data having different shooting time-points;
    a thumbnail generation unit configured to generate resized image data by performing resize processing of reducing a size of image data of at least one frame constituting the moving image data based on the moving image data generated by the imaging unit, and generate a thumbnail representing the moving image data by combining a resized image corresponding to the resized image data with a template having a display area displaying information indicating that a different piece of the moving image data may be connected;
    a display controller configured to display the thumbnail generated by the thumbnail generation unit on the display unit; and
    an operating unit configured to receive an input of a start signal instructing a start of continuously imaging the subject to the imaging unit and a finish signal instructing a finish of the continuously imaging to the imaging unit,
    wherein the moving image mode includes:
        a first moving image mode that generates the moving image data by causing the imaging unit to continuously image the subject from a point of input of the start signal until a point of input of the finish signal; and
        a second moving image mode that generates the moving image data by causing the imaging unit to continuously image the subject for a prescribed time-span from the point of input of the start signal from the operating unit, the second moving image mode being capable of connecting different pieces of the moving image data generated by the imaging unit at different time-points,
    the shooting controller controls the imaging unit to start the continuously imaging in the first moving image mode or the second moving image mode when the operating unit has received the input of the start signal,
    the thumbnail generation unit generates the thumbnail when the imaging unit has generated the moving image data in the second moving image mode, and
    when the imaging unit has generated the moving image data in the first moving image mode, the thumbnail generation unit generates the thumbnail and thereafter generates trimming image data by performing trimming processing onto an area including the resized image on the thumbnail, and generates a first moving image thumbnail representing the moving image data captured in the first moving image mode by performing, onto the trimming image data, resize processing of enlargement up to an area that covers the display area.

2. The imaging apparatus according to claim 1,
    wherein the display controller displays the thumbnail on the display unit after adding, to the thumbnail, information for distinguishing between the first moving image mode and the second moving image mode.

3. The imaging apparatus according to claim 1, further comprising an image processing unit configured to connect different pieces of the moving image data having different shooting time-points generated in the second moving image mode,
    wherein, when the image processing unit has connected the different pieces of the moving image data generated in the second moving image mode, the thumbnail generation unit generates a combined thumbnail that combines the respective thumbnails of at least the moving image data having an oldest shooting time-point and the moving image data having a latest shooting time-point, among the different pieces of the moving image data generated in the second moving image mode, and
    the display controller displays the combined thumbnail generated by the thumbnail generation unit on the display unit.

4. The imaging apparatus according to claim 1, further comprising a setting unit configured to set the first moving image mode or the second moving image mode, wherein the operating unit is configured to receive an input of an instruction signal for setting the first moving image mode or the second moving image mode, the setting unit sets the first moving image mode or the second moving image mode in accordance with the instruction signal input from the operating unit, and when the operating unit has received the input of the start signal, the shooting controller controls the imaging unit to start the continuously imaging in the moving image mode according to the setting of the setting unit.

5. The imaging apparatus according to claim 1, further comprising an operating unit configured to receive an input of a start signal for controlling the imaging unit to start generation of the moving image data, wherein, when the operating unit has received the input of the start signal, the shooting controller controls the imaging unit to generate the moving image data for a prescribed time, and when the imaging unit has finished generation of the moving image data, the display controller plays back and displays, on the display unit, reference moving image corresponding to the moving image data, and thereafter, plays back and displays, on the display unit, a connection moving image corresponding to the connection moving image data that may be connected with the reference moving image.

6. The imaging apparatus according to claim 5, wherein the connection moving image data are the moving image data generated by the imaging unit prior to the reference moving image, and the display controller repetitively plays back and displays the reference moving image and the connection moving image, on the display unit.

7. The imaging apparatus according to claim 5, wherein the operating unit is configured to receive an input of a change signal for changing an order of playback of the reference moving image and the connection moving image displayed on the display unit, and when the operating unit has received the input of the change signal, the display controller changes the order of playback of the connection moving image and the reference moving image and displays the connection moving image and the reference moving image in the changed order on the display unit.

8. The imaging apparatus according to claim 5, comprising a setting unit configured to set a plurality of moving image modes on the imaging apparatus, wherein the operating unit is configured to receive an input of a finish signal for controlling the imaging unit to finish generation of the moving image data, the plurality of moving image modes include:

a first moving image mode that causes the imaging unit to generate the moving image data from a point at which the operating unit receives the input of the start signal until a point at which the operating unit receives the input of the finish signal; and a second moving image mode that causes the imaging unit to generate the moving image data for a prescribed time-span from the point of input of the start signal from the operating unit, the second moving image mode being capable of mutually connecting a plurality of pieces of the moving image data generated by the imaging unit at different time-points, the shooting controller controls the imaging unit to generate the moving image data in accordance with the setting performed by the setting unit, and the display controller plays back and displays the reference moving image alone on the display unit when the first moving image mode is set onto the imaging apparatus by the setting unit, while the display controller plays back and displays, on the display unit, the connection moving image generated in the second moving image mode by the imaging unit prior to the reference moving image, and the reference moving image, when the second moving image mode is set onto the imaging apparatus by the setting unit.

9. The imaging apparatus according to claim 5, further comprising an image processing unit configured to connect the reference moving image generated by the imaging unit with the connection moving image generated by the imaging unit prior to the reference moving image, wherein the operating unit is configured to receive an input of a stop signal for stopping playback of the reference moving image, and when the operating unit has received the input of the stop signal, the image processing unit connects the reference moving image with the connection moving image.

10. The imaging apparatus according to claim 9, wherein the operating unit is configured to receive an input of a deletion signal for prohibiting connection between the connection moving image and the reference moving image and deleting the reference moving image, and when the operating unit has received the input of the deletion signal, the image processing unit deletes the reference moving image.

11. A display method executed by an imaging apparatus including an imaging unit configured to continuously image a subject and generate moving image data of the subject, an operating unit, and a display unit configured to display a moving image corresponding to the moving image data, the method comprising:

controlling the imaging unit to continuously image the subject in a moving image mode capable of connecting different pieces of the moving image data having different shooting time-points;

generating resized image data by performing resize processing of reducing a size of image data of at least one frame constituting the moving image data based on the moving image data generated by the imaging unit;

generating a thumbnail representing the moving image data by combining a resized image corresponding to the resized image data with a template having a display area displaying information indicating that a different piece of the moving image data may be connected;

displaying the thumbnail generated by the thumbnail generation unit on the display unit;

receiving, with the operating unit, an input of a start signal instructing a start of continuously imaging the subject to the imaging unit and a finish signal instructing a finish of the continuously imaging to the imaging unit, wherein the moving image mode includes:

a first moving image mode that generates the moving image data by causing the imaging unit to continuously image the subject from a point of input of the start signal until a point of input of the finish signal; and a second moving image mode that generates the moving image data by causing the imaging unit to continuously image the subject for a prescribed time-span from the point of input of the start signal from the operating unit, the second moving image mode being capable of connecting different pieces of the moving image data generated by the imaging unit at different time-points;

controlling the imaging unit to start the continuously imaging in the first moving image mode or the second moving image mode when the operating unit has received the input of the start signal;

generating the thumbnail when the imaging unit has generated the moving image data in the second moving image mode; and when the imaging unit has generated the moving image data in the first moving image mode, generating the thumbnail and thereafter generating trimming image data by performing trimming processing onto an area including the resized image on the thumbnail, and generating a first moving image thumbnail representing the moving image data captured in the first moving image mode by performing, onto the trimming image data, resize processing of enlargement up to an area that covers the display area.

12. A non-transitory computer-readable recording medium with an executable program stored thereon, the program causing a processor of an imaging apparatus including an imaging unit configured to continuously image a subject and generate moving image data of the subject, an operating unit, and a display unit configured to display a moving image corresponding to the moving image data, to execute:

controlling the imaging unit to continuously image the subject in a moving image mode capable of connecting different pieces of the moving image data having different shooting time-points;

generating resized image data by performing resize processing of reducing a size of image data of at least one frame constituting the moving image data based on the moving image data generated by the imaging unit;

generating a thumbnail representing the moving image data by combining a resized image corresponding to the resized image data with a template having a display area displaying information indicating that a different piece of the moving image data may be connected;

displaying the thumbnail generated by the thumbnail generation unit on the display unit;

receiving, with the operating unit, an input of a start signal instructing a start of continuously imaging the subject to the imaging unit and a finish signal instructing a finish of the continuously imaging to the imaging unit, wherein the moving image mode includes:

a first moving image mode that generates the moving image data by causing the imaging unit to continuously image the subject from a point of input of the start signal until a point of input of the finish signal; and a second moving image mode that generates the moving image data by causing the imaging unit to continuously image the subject for a prescribed time-span from the point of input of the start signal from the operating unit, the second moving image mode being capable of connecting different pieces of the moving image data generated by the imaging unit at different time-points;

controlling the imaging unit to start the continuously imaging in the first moving image mode or the second moving image mode when the operating unit has received the input of the start signal;

generating the thumbnail when the imaging unit has generated the moving image data in the second moving image mode; and when the imaging unit has generated the moving image data in the first moving image mode, generating the thumbnail and thereafter generating trimming image data by performing trimming processing onto an area including the resized image on the thumbnail, and generating a first moving image thumbnail representing the moving image data captured in the first moving image mode by performing, onto the trimming image data, resize processing of enlargement up to an area that covers the display area.

* * * * *